(12) United States Patent
Kameyama

(10) Patent No.: US 7,038,404 B2
(45) Date of Patent: May 2, 2006

(54) IMAGE FORMING APPARATUS

(75) Inventor: Shigeru Kameyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 10/188,751

(22) Filed: Jul. 5, 2002

(65) Prior Publication Data

US 2003/0020423 A1 Jan. 30, 2003

(30) Foreign Application Priority Data

Jul. 6, 2001 (JP) ......................... 2001-206080

(51) Int. Cl.
*H02P 1/54* (2006.01)

(52) U.S. Cl. .................... 318/34; 318/569; 318/567
(58) Field of Classification Search ............ 318/34, 318/560, 569, 567; 355/208; 369/50; 701/49; 379/301; 388/800, 907.5
See application file for complete search history.

(56) References Cited

U.S. PATENT DOCUMENTS

| 4,752,804 A | * | 6/1988 | Ohno ......................... 399/300 |
| 5,373,351 A | * | 12/1994 | Umeda et al. ................. 399/66 |
| 5,696,594 A | * | 12/1997 | Saito et al. .................. 358/296 |
| 5,881,346 A | | 3/1999 | Mori et al. .................. 399/301 |
| 5,986,988 A | * | 11/1999 | Kusano et al. ........... 369/47.41 |
| 6,243,635 B1 | * | 6/2001 | Swan et al. ................... 701/49 |

FOREIGN PATENT DOCUMENTS

JP 9-146329 6/1997

\* cited by examiner

*Primary Examiner*—Karen Masih
(74) *Attorney, Agent, or Firm*—Fitzpatrick, Cella, Harper & Scinto

(57) ABSTRACT

An image forming apparatus is provided, which is capable of performing phase control of rotation bodies inexpensively and accurately and is capable of reducing time until completion of phase adjustment at the time of a print operation to prevent first print time from becoming long. This image forming apparatus includes a device for detecting a home position of rotation bodies, a motor, and a motor control device for controlling the motor by a software servo, in which said motor control device has a position control function with respect to the motor.

22 Claims, 13 Drawing Sheets

IMAGE FORMING APPARATUS

BACKGROUND OF THE INVENTION

1. Field of the Invention

The present invention relates to an image forming apparatus, for example, an image forming apparatus of an electrophotographic system.

2. Description of Related Art

An example of a conventional image forming apparatus will be described with reference to FIGS. 12 and 13.

FIG. 12 is a view illustrating motors and an image forming part. FIG. 13 is a view illustrating a DC brushless motor and its vicinities.

FIG. 12 shows a multicolor image forming apparatus provided with motors and rotation bodies for four colors, namely, yellow Y, magenta M, cyan C, and black K. In FIG. 12, reference symbols 1Y, 1M, 1C and 1K denote the rotation bodies such as photosensitive drums functioning as developing units for forming and developing electrostatic latent images (1Y, 1M, 1C and 1K denote the rotation bodies for Y, M, C and K, respectively), and reference symbols 6Y, 6M, 6C and 6K denote the motors for driving the rotation bodies 1Y, 1M, 1C and 1K, respectively.

Reference symbols 2Y, 2M, 2C and 2K denote laser scanners for performing exposure in response to an image signal to form electrostatic latent images on the rotation bodies 1Y, 1M, 1C and 1K. Numeral 3 donates an endless conveyor belt for sequentially conveying a sheet to the rotation bodies 1Y, 1M, 1C and 1K for each color. Numeral 4 denotes driving rollers that consist of motors, gears, and the like and are connected to a driving means to drive the conveyor belt 3. Numeral 6e denotes a motor for driving the driving rollers 4. Numeral 5 denotes a fixing device for melting and fixing toner transferred onto a sheet. Numeral 15 denotes motors and an image forming part.

Data to be printed is sent to a printer from a personal computer (PC). When image formation according to a system of a printer engine ends and a printer comes to be in a printable state, a sheet is fed from a sheet cassette and reaches the conveyor belt 3 to be conveyed one after another.

An image signal of each color is sent to each of the laser scanners 2Y, 2M, 2C and 2K with taking timing with the conveyance of the sheet by the conveyor belt 3. Electrostatic latent images are formed on the rotation bodies 1Y, 1M, 1C and 1K. The electrostatic latent images are developed with toner by a developing device (not shown) and transferred onto the sheet in a transferring part (not shown).

In FIG. 12, images are sequentially formed in the order Y, M, C and K.

Thereafter, the sheet is separated from the conveyor belt 3, toner images are fixed thereon by heat in the fixing device 5, and the sheet is discharged to the outside (i.e., is discharged from the apparatus).

For example, a DC brushless motor is used as each of the motors 6Y, 6M, 6C, 6K and 6e.

An example of a configuration of the DC brushless motor is shown in FIG. 13.

Reference numeral 51 denotes coils; numeral 52 denotes a rotor; numeral 53 denotes Hall elements; numeral 54 denotes an amplifier; numeral 55 denotes a magnetic pattern; numeral 56 denotes a magnetic sensor; numeral 57 denotes an amplifier; numeral 58 denotes a current logic circuit for controlling current; numeral 60 denotes a rate control part; numeral 61 denotes an F/V converter; numeral 62 denotes a comparator; numeral 63 denotes a PLL; numeral 64 denotes a mixer; numeral 65 denotes a PWM signal generator; numeral 70 denotes a driver; numeral 71 denotes high-side transistors; numeral 72 denotes low-side transistors; numeral 80 denotes a current limiter; numeral 81 denotes a current detection resistor; and numeral 82 denotes a comparator. Reference symbols HU, HV and HW denote rotor position signals, and UU, UV and UW, and LU, LV and LW denote phase switching signals.

The DC brushless motor 50 has the U, V and W coils 51 connected in three-phase star connection and the rotor 52.

Moreover, the DC brushless motor 50 is provided with three Hall elements 53 for detecting polarity of the rotor as a position detecting means of the rotor 52. Outputs of the Hall elements are amplified by the amplifier 54.

In addition, the DC brushless motor 50 has a rotation rate detecting means consisting of the magnetic pattern 55 and the magnetic sensor 56 that are provided on an outer circumference of the rotor 52. An output of the rotation rate detecting means is amplified by the amplifier 57 and inputted in the rate control part 60.

Reference numeral 70 denotes a driver for driving the DC brushless motor 50 and is provided with three high-side transistors 71 and three low-side transistors 72, which are connected to the U, V and W coils 51, respectively.

The current logic circuit 58 specifies a position of the rotor 52 in response to the rotor the position signals HU to HW generated by the Hall elements 53 and generates the phase switching signals UU, UV and UW, and LU, LV and LW.

The phase switching signals UU, UV and UW, and LU, LV and LW sequentially switch phases for controlling on/off of each of the transistors 71 and 72 of the driver 70 to sequentially switch a phase to be excited and rotate the rotor 52.

The rate control part 60 generates a voltage proportional to the number of motor rotations by the F/V converter 61 and, then, compares the voltage with a reference voltage by the comparator 62 to obtain a differential output of the voltages.

In addition, the rate control part 60 compares phases of a motor rotation frequency signal and a reference frequency signal by the PLL 63 to obtain an output according to phase shift.

Moreover, the rate control part 60 mixes these two outputs by the mixer 64 and generates a PWM signal by the PWM signal generator 65.

In the multicolor image forming apparatus configured as described above, misalignment of a print position of each color appears on an image as color drift and causes deterioration of image quality.

Color drift is generally classified into steady color drift caused by position deviation at the time of assembling a developing device of each color, or the like (hereinafter referred to as DC color misregistration), and periodic color drift caused by swinging of the shafts of the rotation bodies 1Y, 1M, 1C and 1K, or the like (hereinafter referred to as AC color misregistration).

As a measure for coping with the AC color drift, there is known a method of individually controlling rotation phases of the rotation bodies 1Y, 1M, 1C and 1K for each color. As a method of adjusting phases of the rotation bodies 1Y, 1M, 1C and 1K, for example, the technique disclosed in Japanese Patent Application Laid-Open No. 9-146329 is proposed.

With such a technique, rotary encoders which are capable of outputting many signals in one rotation and are capable of outputting one signal in one rotation, are provided in the rotation shafts of the rotation bodies 1Y, 1M, 1C and 1K in order to control the rotation phases of the rotation bodies 1Y, 1M, 1C and 1K. The rotation phases of the rotation bodies 1Y, 1M, 1C and 1K are detected by outputs of the rotary encoders and are used to control driving of the DC brushless motor idly or at a rate higher or lower than a normal rotation rate, whereby the phases of the rotation bodies 1Y, 1M, 1C and 1K are adjusted.

However, there are the following problems in the above-mentioned conventional example.

The rotary encoder which is capable of outputting many signals in one rotation and is capable of outputting one signal in one rotation, is expensive. This increases costs particularly in an image forming apparatus provided with the rotation bodies 1Y, 1M, 1C and 1K for four colors.

In addition, due to the idle rotation of the motor, a braking function for quickly stopping the motor at a point in predetermined lead phase is necessary in order to perform phase control. A rate variable function is required in order to rotate the motor at a rate higher or lower than a normal rotation rate. Both of these requirements cause increases in the cost of the motor.

However, even if improvement of resolution of phase control is attempted, high accuracy position control of the motor is difficult, and effects of the phase control cannot be sufficiently obtained with such a control method.

In particular, in a printer for which a reduction in cost is required, this control method has relatively poor cost performance and is not suitable for practical use.

In addition, since each of the rotation bodies 1Y, 1M, 1C and 1K has a different load torque, the time required for reaching a steady rate or time required for stopping is different for each of the rotation bodies 1Y, 1M, 1C and 1K. Thus, a rotation phase is likely to shift significantly every time startup and stop of the motor are repeated.

Consequently, a longer time is required for aligning a phase, and first print time is extended if the start of a print operation is delayed until phase adjustment ends.

When a stepping motor is used instead of the DC brushless motor, phase control can be performed relatively easily. However, since the mechanical efficiency of the stepping motor is low, power consumption is large. Therefore, the multicolor image forming apparatus using a plurality of motors needs a large-capacity power supply, which causes an increase in size and costs.

SUMMARY OF THE INVENTION

The present invention has been devised in view of the above-mentioned drawbacks, and it is an object of the present invention to provide an image forming apparatus that is capable of performing phase control of rotation bodies inexpensively and accurately and is capable of reducing the time until completion of phase adjustment at the time of a print operation to prevent first print time from becoming long.

According to the present invention, there is provided a multicolor image forming apparatus that includes a motor and a rotation body driven by the motor, for each color, and has a function of inhibiting color drift by controlling a rotation phase of at least the rotation body for one color. Also included are: means for detecting a position of one rotation body; and motor control means for controlling the motor by a software servo, in which the motor control means has a position control function with respect to the motor.

Another object of the present invention is to provide motor control means to apply position control to said motor, calculate position error information for the motor from home position information of the rotation body obtained by the means for detecting the home position of the rotation body, apply position control to that motor so as to eliminate the position error, and controls a rotation phase of that rotation body.

A further object of the present invention is to provide motor control means having a rate control, to apply position control as well as rate control to the motor, calculate position error information for the motor from home position information of that rotation body obtained by the means for detecting a home position of a rotation body, apply position control to the motor so as to eliminate the position error, and control a rotation phase of the rotation body.

A further object of the present invention is to provide means for detecting a home position of a rotation body that outputs home position information once in one rotation.

A further object of the present invention is to provide motor control means to change a value of a coefficient for calculation of a position control operation amount of the motor according to a value of a position error with respect to the motor.

A further object of the present invention is to provide, in a case of starting up a plurality of such motors, motor control means that controls the motors such that a relative member of rotations of each motor is minimized.

A further object of the present invention is to provide, in a case of stopping a plurality of motors, motor control means controls the motors such that a relative number of rotations of each motor is minimized.

A still further object of the present invention is to provide initial sequence to execute cleaning operation or the like of each rotation body when a power supply is applied to a printer driver or when a door to the inside of the printer driver is closed.

Other objects, elements and effects of the present invention will become apparent from the following detailed description and accompanying drawings, in which like reference characters designate the same or similar parts throughout the figures thereof.

DESCRIPTION OF THE PREFERRED EMBODIMENTS

The present invention will be hereinafter described in detail based on the preferred embodiments.

(First embodiment)

Figure 1:
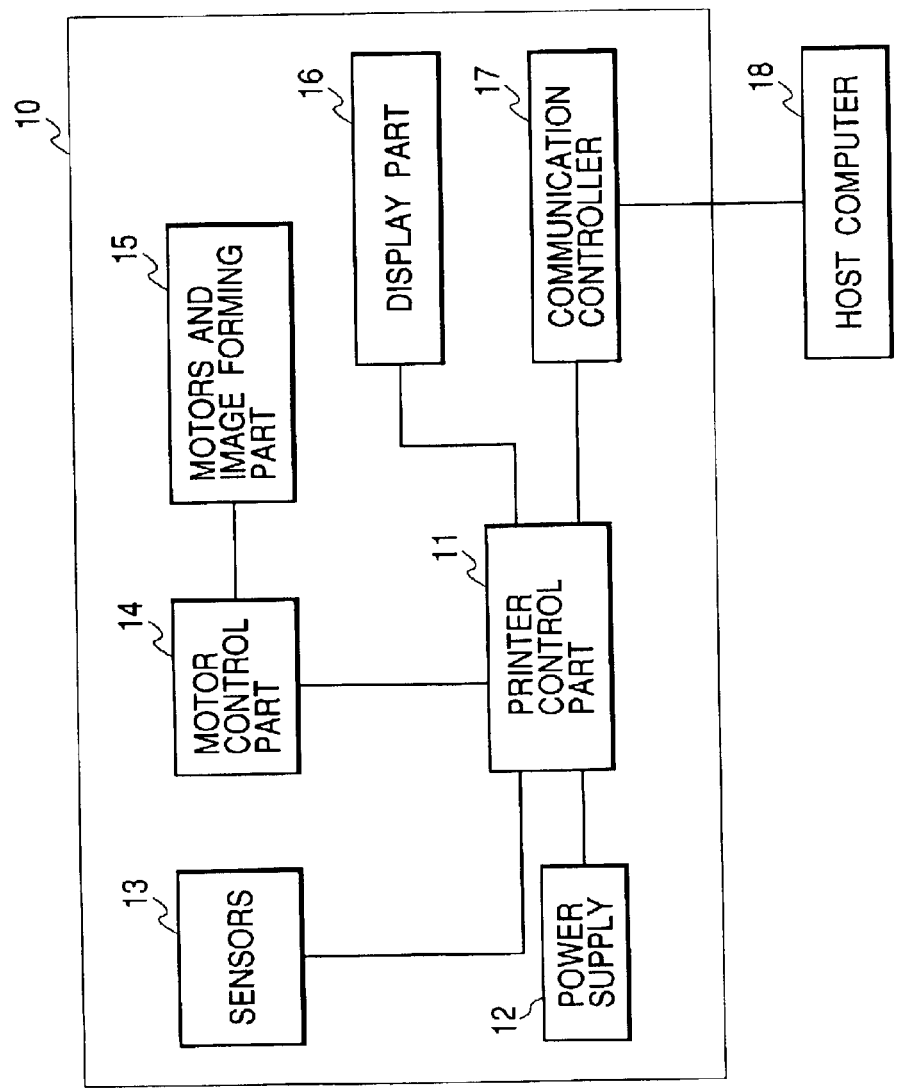
FIG. 1 is a diagram illustrating a schematic configuration of a control system of an image forming apparatus in accordance with the present invention.

FIG. 1 shows a schematic configuration of a control system of an image forming apparatus in accordance with the present invention.

In FIG. 1, reference numeral 10 denotes a printer functioning as an image forming apparatus.

Reference numeral 11 denotes a printer control part for controlling each device in the printer 10.

Reference numeral 12 denotes a power supply for supplying power to each device in the printer 10.

Reference numeral 13 denotes sensors for detecting a state of each part in the printer 10.

Reference numeral 14 denotes a motor control part functioning as a motor control means for controlling motors according to an instruction of the printer control part 11.

Reference numeral 15 denotes motors and an image forming part in the printer 10.

Reference numeral 16 denotes a display part for informing a user of an operation state of the printer 10.

Reference numeral 17 denotes a communication controller for controlling communication between the printer 10 and a host computer 18.

Reference numeral 18 denotes a host computer such as a PC for transferring data to be printed to the printer 10.

Figure 2:
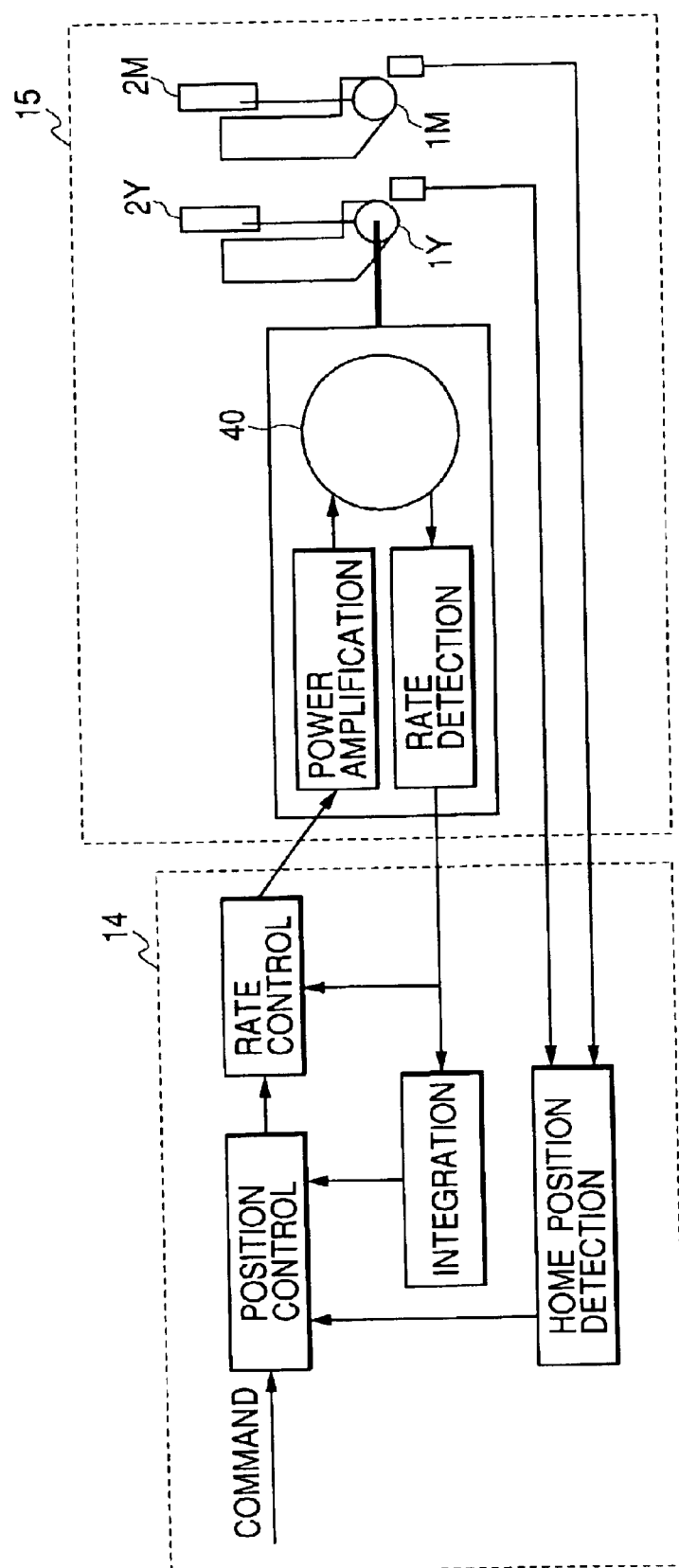
FIG. 2 is a diagram illustrating a configuration of a main part in accordance with a first embodiment of the present invention.
Figure 3:
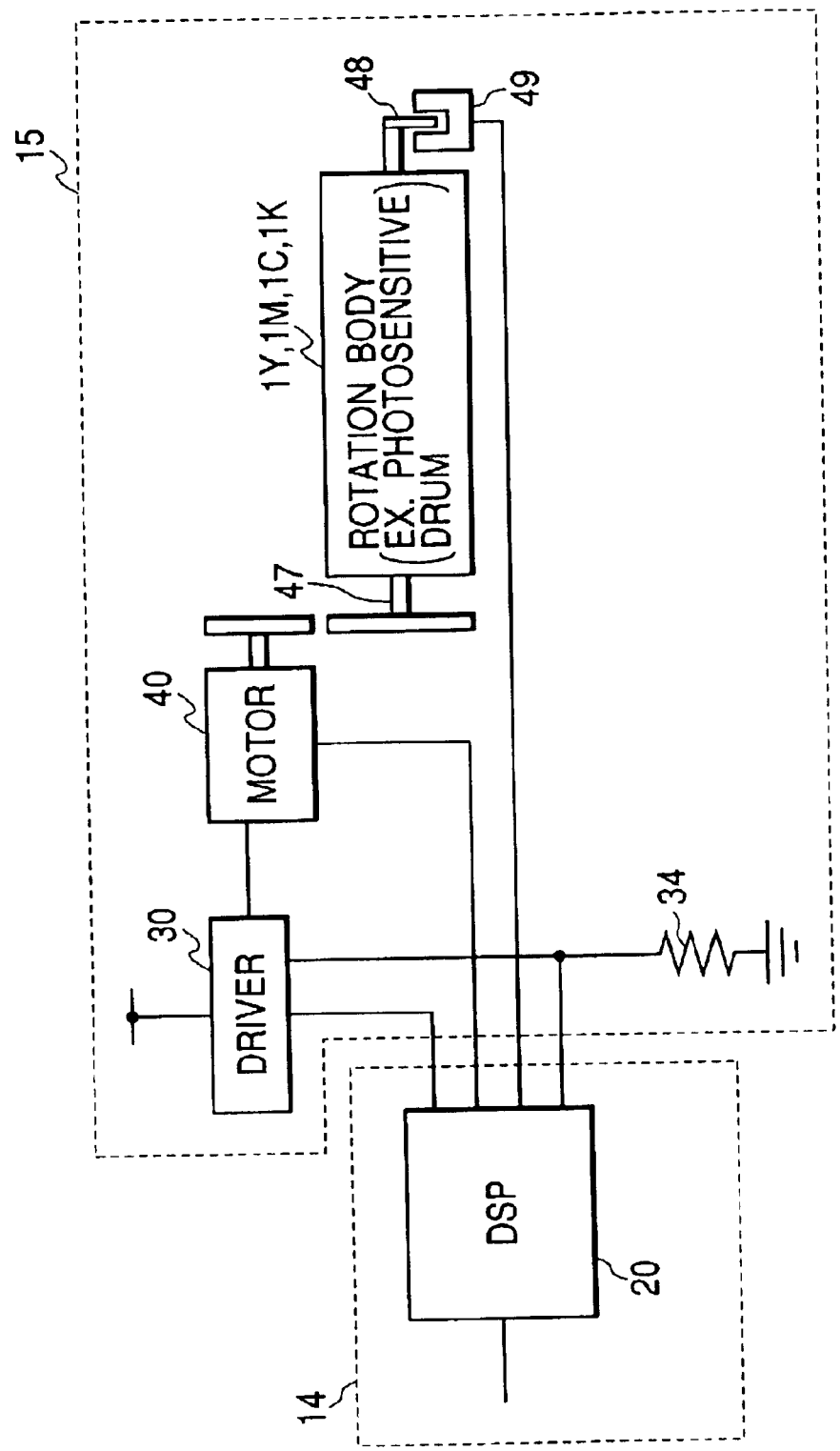
FIG. 3 is a diagram illustrating a configuration of a main part of the first embodiment of the present invention.
Figure 4:
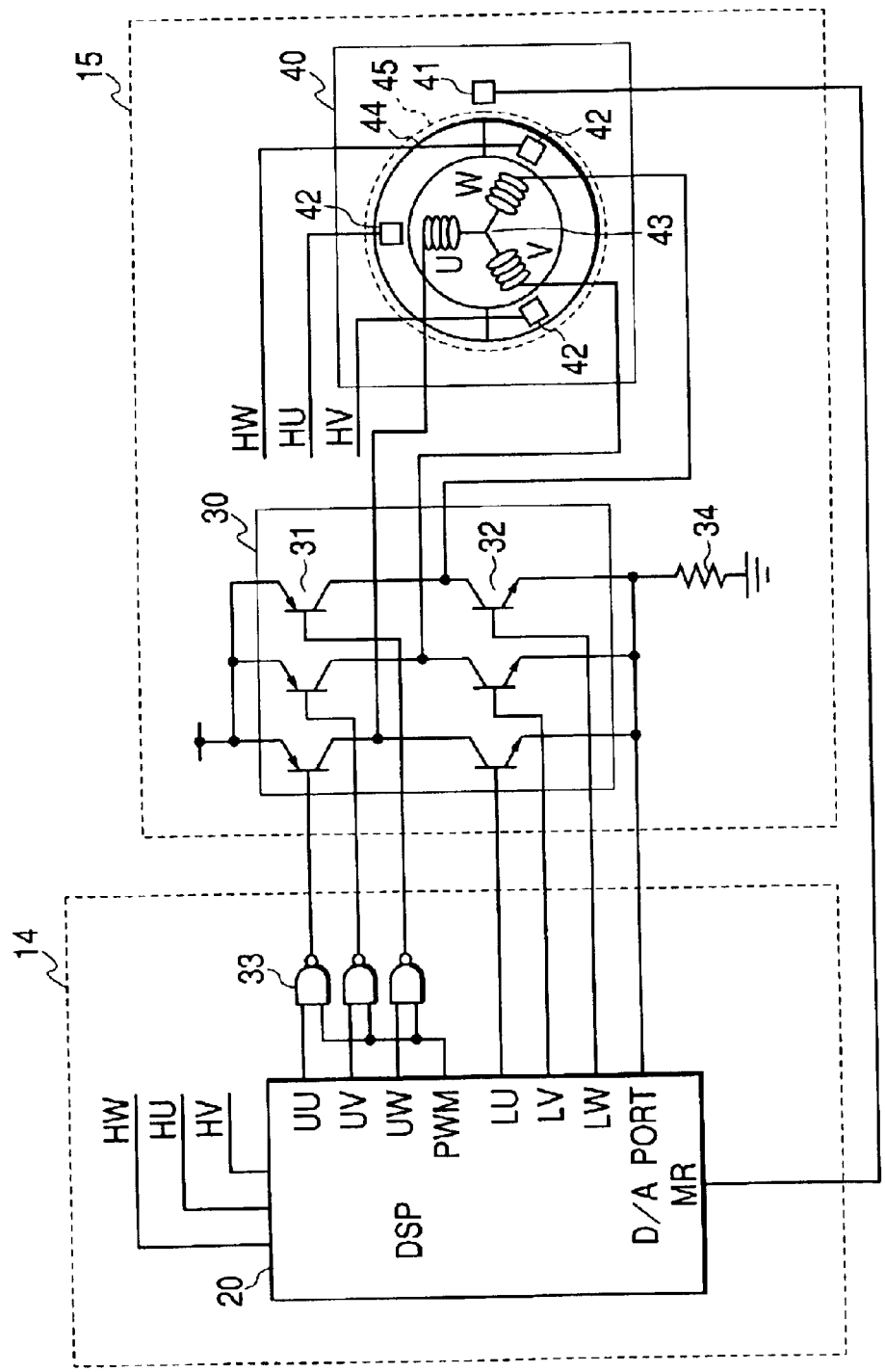
FIG. 4 is a diagram illustrating a configuration of a main part of the first embodiment of the present invention.

FIGS. 2, 3 and 4 show configurations of main parts of a first embodiment in accordance with the present invention.

Reference numeral 20 denotes a DSP having a position control function and a rate control function. (Although a DSP or a microcomputer is generally used, the first embodiment explained by using a DSP. Numeral 30 denotes a driver for controlling electric power to a DC brushless motor 40. Numeral 31 denotes high-side transistors. Numeral 32 denotes low-side transistors. Numeral 33 denotes NAND gates. Numeral 34 denotes a current detection resistor. Numeral 40 denotes a motor, namely a DC brushless motor that is one of plural DC motors provided in this embodiment. Numeral 41 denotes a magnetic sensor. Numeral 42 denotes Hall elements. Numeral 43 denotes coils. Numeral 44 denotes a rotor. Numeral 45 denotes a magnetic pattern. Numeral 47 denotes a rotation shaft. Numeral 48 denotes a flag. Numeral 49 denotes a photo sensor.

The flag 48 and the photo sensor 49 constitute means for detecting home positions of rotation bodies 1Y, 1M, 1C and 1K.

That is, the flags 48 are provided in the rotation shafts 47 of the rotation bodies 1Y, 1M, 1C and 1K to block off an optical path of the photo sensor 49 as the rotation shafts 47 rotate.

Consequently, home position information is outputted once in one rotation of the rotation bodies 1Y, 1M, 1C and 1K in a form of a signal (home position information to be outputted in the form of a signal is hereinafter referred to as a home position signal).

Alternatively, the flags 48 may be provided in the rotation bodies 1Y, 1M, 1C and 1K or gears for driving the rotation bodies 1Y, 1M, 1C and 1K to shield the photo sensor 49.

The DC brushless motor 40 includes the U, V and W coils 43 connected in three-phase star connection and the rotor 44.

Moreover, the DC brushless motor 40 is provided with three Hall elements 42 for detecting polarity of the rotor 44 as a position detecting means of the rotor 44 and outputs of the Hall elements 42 are connected to the DSP 20.

In addition, the DC brushless motor 40 has a rotation rate detecting means consisting of the magnetic pattern 45 and the magnetic sensor 41 that are provided on an outer circumference of the rotor 44 and an output of the rotation rate detecting means is connected to the DSP 20.

Reference numeral 30 denotes a driver for driving the DC brushless motor 40, which is provided with three high-side transistors 31 and three low-side transistors 32 and is connected to the U, V, and W coils 43, respectively.

Reference numeral 34 denotes a current detection resistor, which converts a motor driving current to a voltage. The generated voltage is taken into a D/A port of the DSP 20.

The DSP 20 specifies a position of the rotor 44 in response to rotor position signals HU, HV and HW generated by the Hall elements 42 and generates a phase switching signal.

Phase switching signals UU, UV and UW, and LU, LV and LW control on/off of each of the transistors 31 and 32 of the driver 30 to sequentially switch a phase to be excited and rotate the rotor 44.

Moreover, the DSP 20 compares a rotation rate target value and rotation rate information to obtain rate error information in order to perform rate control.

In addition, the DSP 20 compares position information of the rotor 44 obtained by integrating the rotation rate information and a position target value to obtain position error information in order to perform position control.

The DSP 20 calculates an amount of motor operation from the above-mentioned rate error information and position error information to generate and output a PWM signal according to a result of the calculation.

The PWM signal has duty 0 at 0 and duty 100 at 255.

The PWM signal is subject to Nand by the phase switching signals UU, UV and UW and the NAND gates 33 to perform chopping of a driving current and control a rotation rate of the DC brushless motor 40.

Note that the DPS 20 may process all the controls without using the NAND gates 33.

The DSP 20 performs phase switching control in response to the rotor position signals HU, HV and HW from the DC brushless motor 40 and startup and stop control of the DC brushless motor 40 in response to a control signal from the printer control part 11, and compares a rate signal from the printer control part 11 and an output of the rate detecting means to perform rate control of the DC brushless motor 40 via the driver 30.

With the above-mentioned configuration,.the high-performance DSP 20 or microcomputer, which is now available at a low price, performs digital signal processing and performs driving control of the DC brushless motor 40 by means of a software servo.

Figure 5:
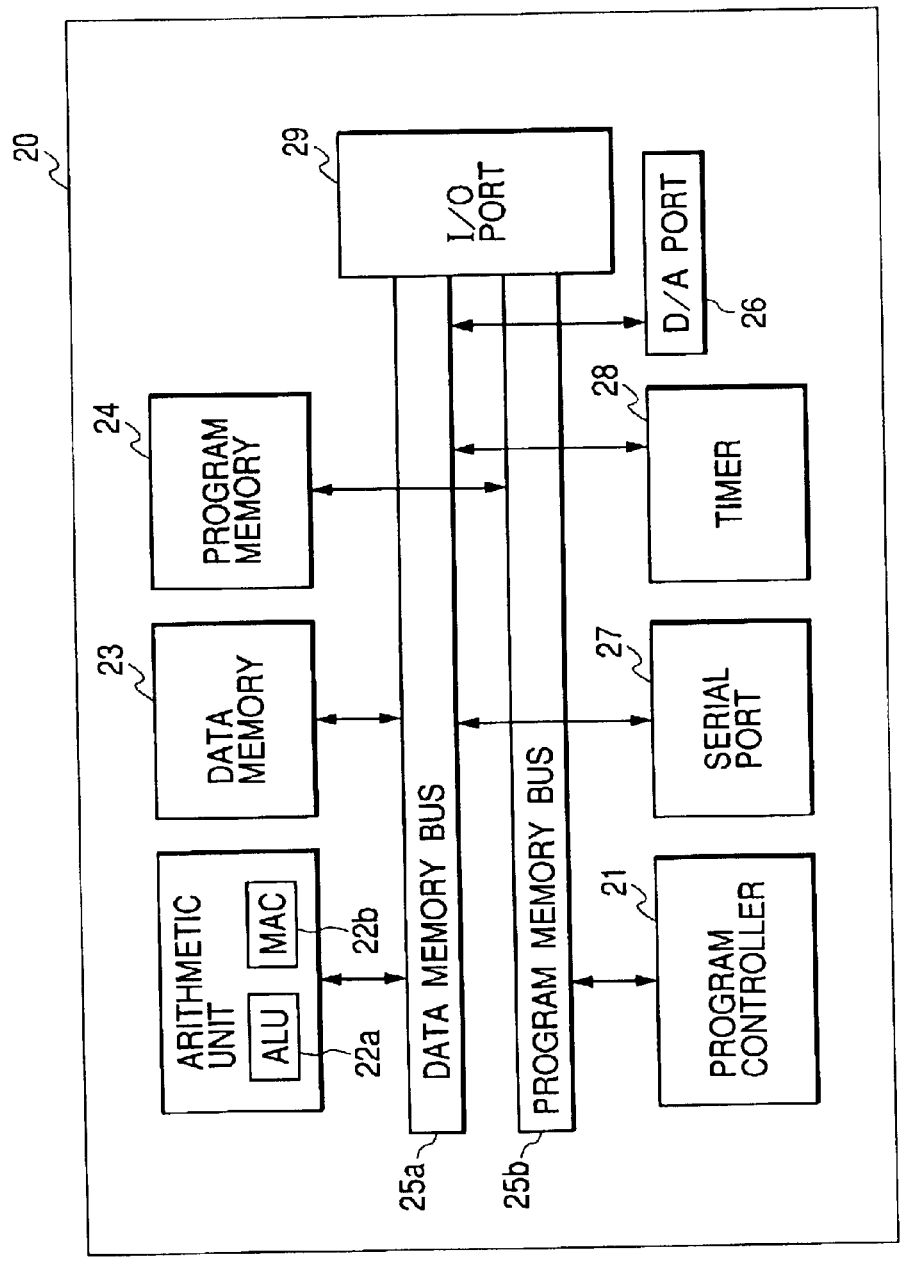
FIG. 5 is a block diagram of a DSP.

FIG. 5 shows a block diagram of the DSP 20.

Reference numeral 21 denotes a program controller. Numeral 22a denotes an ALU for performing addition and subtraction and logical operations. Numeral 22b denotes an MAC for performing multiplication and addition. Numeral 23 denotes a memory for data. Numeral 24 denotes a program memory. Numeral 25*a* denotes a data memory bus. Numeral 25*b* denotes a program memory bus. Numeral 26 denotes a D/A port. Numeral 27 denotes a serial port. Numeral 28 denotes a timer. Numeral 29 denotes an I/O port.

In this way, the DSP 20 includes the memories for data and program provided independently from each other, the data bus and the program bus provided separately, and the MAC 22*b* for executing multiplication and addition in one machine cycle, thereby making it possible to perform a high-speed operation.

Actions of the motor control part of the present invention will be hereinafter described.

Figure 6:
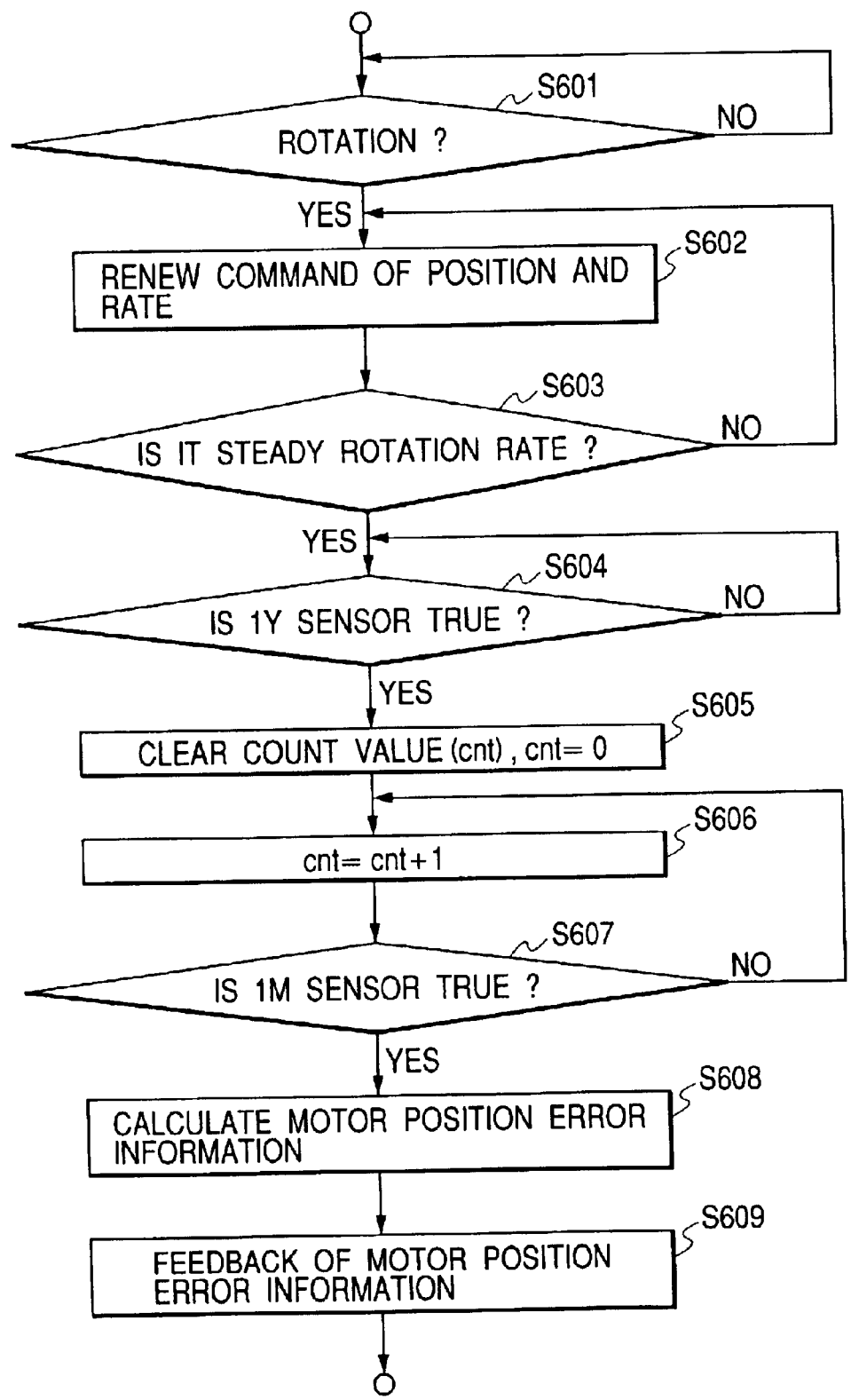
FIG. 6 is a flow chart explaining operations of the first embodiment of the present invention.
Figure 7:
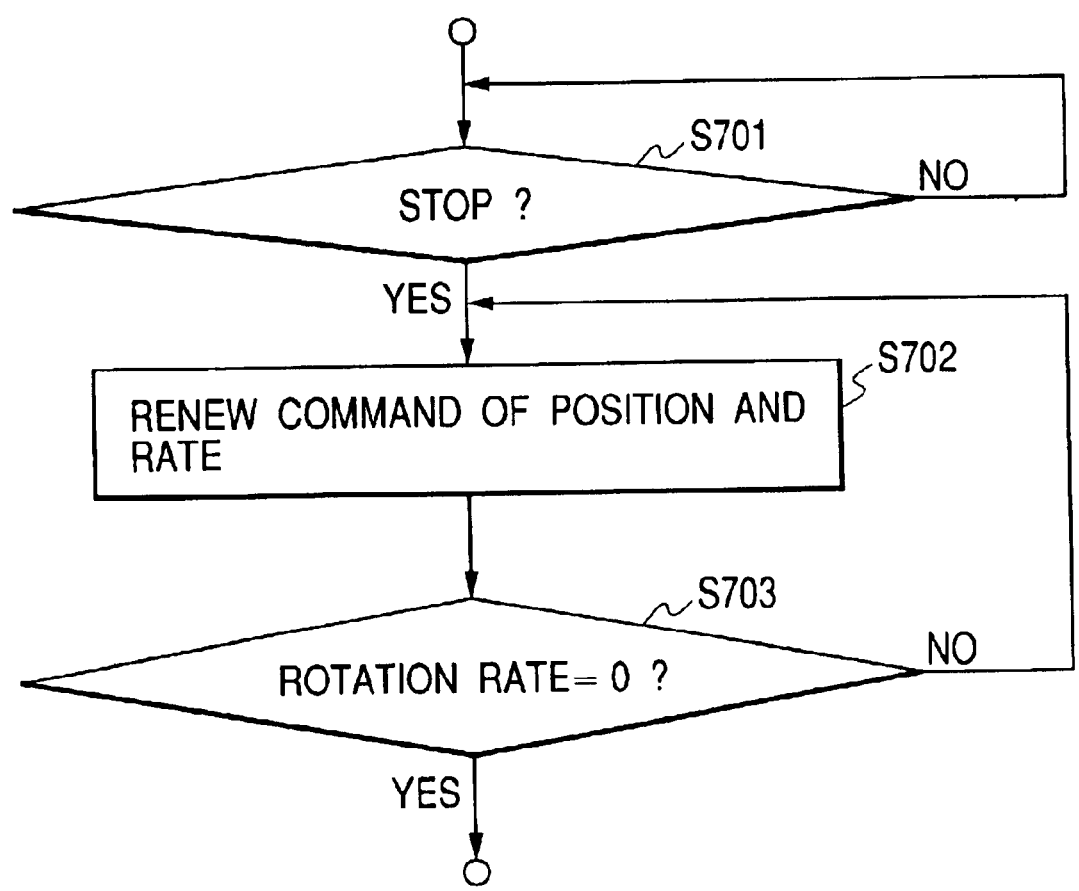
FIG. 7 is a flow chart explaining operations of the first embodiment of the present invention.

A case in which the rotation bodies 1Y, 1M, 1C and 1K are photosensitive drums, and a reference rotation body is the rotation body 1Y and phase control is performed with respect to the rotation body 1M will be described based on FIGS. 6 and 7.

When startup of the DC brushless motors 40 is instructed from the printer control part 11 (S601), the motor control part 14 applies rate control and position control to each DC brushless motor 40, renews a command of position and rate in accordance with a predetermined acceleration curve to accelerate each DC brushless motor 40 so as to minimize a relative number of rotations of each DC brushless motor 40 (S602).

When all the DC brushless motors 40 reach a steady rotation rate, the motor control part 14 ends the acceleration (S603) and starts detection of a rotation phase difference between the reference rotation body 1Y and the rotation body 1M.

That is, the motor control part 14 clears a count value cnt for time measurement at a point when a home position signal is outputted from the photo sensor 49 of the reference rotation body 1Y (S604, S605) and thereafter increments the count value cnt at a fixed cycle (S606).

The motor control part 14 stops incrementing the count value cnt at a point when the signal from the photo sensor 49 of the rotation body 1M is outputted (S607) and calculates the position error information of the DC brushless motors 40 from the measured time (S608).

The calculated position error information of the DC brushless motors 40 is fed back to a position control loop of the DC brushless motors 40, and the motor control part 14 performs control so as to eliminate a position error (S609).

In this case, a coefficient for calculation of a position control operation amount, that is, a value of each parameter used in calculation of an operation amount of the position control loop may be changed according to a value of the position error, that is, an absolute value of the position error information.

For example, if the absolute value of the position error information is large, the motor control part 14 decreases a gain of the position control loop to secure stability of control.

When the motor control part 14 is instructed to stop the DC brushless motors 40 from the printer control part 11 (S701), the motor control part 14 renews the command of position and rate in accordance with the fixed deceleration curve to decelerate each DC brushless motor 40 (S702) so as to minimize the relative number of rotations of each DC brushless motor 40, and ends a deceleration sequence at a point when the DC brushless motors 40 stop (S703).

This deceleration curve is assumed to be gentler than a deceleration curve in the case in which the DC brushless motors 40 naturally decelerate by a friction loss when a load torque is the smallest.

As described above, the motor control part 14 controls the DC brushless motors 40 such that a relative number of rotations of each DC brushless motor 40 at the times of startup and stop is minimized, whereby a shift between a desired phase and an actual phase of each of the rotation bodies 1Y, 1M, 1C and 1K is kept small, and the time required until a phase of each of the rotation bodies 1Y, 1M, 1C and 1K is adjusted to a target phase after starting up the CD brushless motors 40, can be reduced.

In addition, the printer control part 11 starts up an initial sequence in order to execute a cleaning operation or the like of the rotation bodies 1Y, 1M, 1C and 1K, a conveyor belt, or the like when a power supply is applied to a printer engine or when an access door to the inside of the printer engine is closed.

When the initial sequence is started, the printer control part 11 instructs the motor control part 14 to start up each DC brushless motor 40.

A rotation phase of each of the rotation bodies 1Y, 1M, 1C and 1K is likely to shift largely from a desired rotation phase when the power supply is turned on or the access door is closed. However, the rotation phase of each of the rotation bodies 1Y, 1M, 1C and 1K can be set at a desired value.

In this case, since a printing operation is not performed, no problem is caused even if phase adjustment takes time. At the time of an actual printing operation, the rotation phase of each of the rotation bodies 1Y, 1M, 1C and 1K is kept in a state in which it is substantially set at the desired phase by the initial sequence. Thus, the phase adjustment ends in a short time and first print time is never extended.

Further, a desired rotation phase, that is, a rotation phase of each of the rotation bodies 1Y, 1M, 1C and 1K for inhibiting AC color drift is obtained in advance by executing a rotation phase detection sequence. The rotation phase is sent to the motor control part 14 from the printer control part 11.

(Second embodiment)

A second embodiment of the present invention will be described.

Since a configuration of the motors and the image forming part 15 and a schematic configuration of a control system of the second embodiment are identical to those in the first embodiment, description of them will be omitted.

The second embodiment is different from the first embodiment in that, when the DC brushless motors 40 are started up and the DC brushless motors 40 in operation are stopped, position control is not performed and the DC brushless motors 40 are controlled only by rate control.

Figure 8:
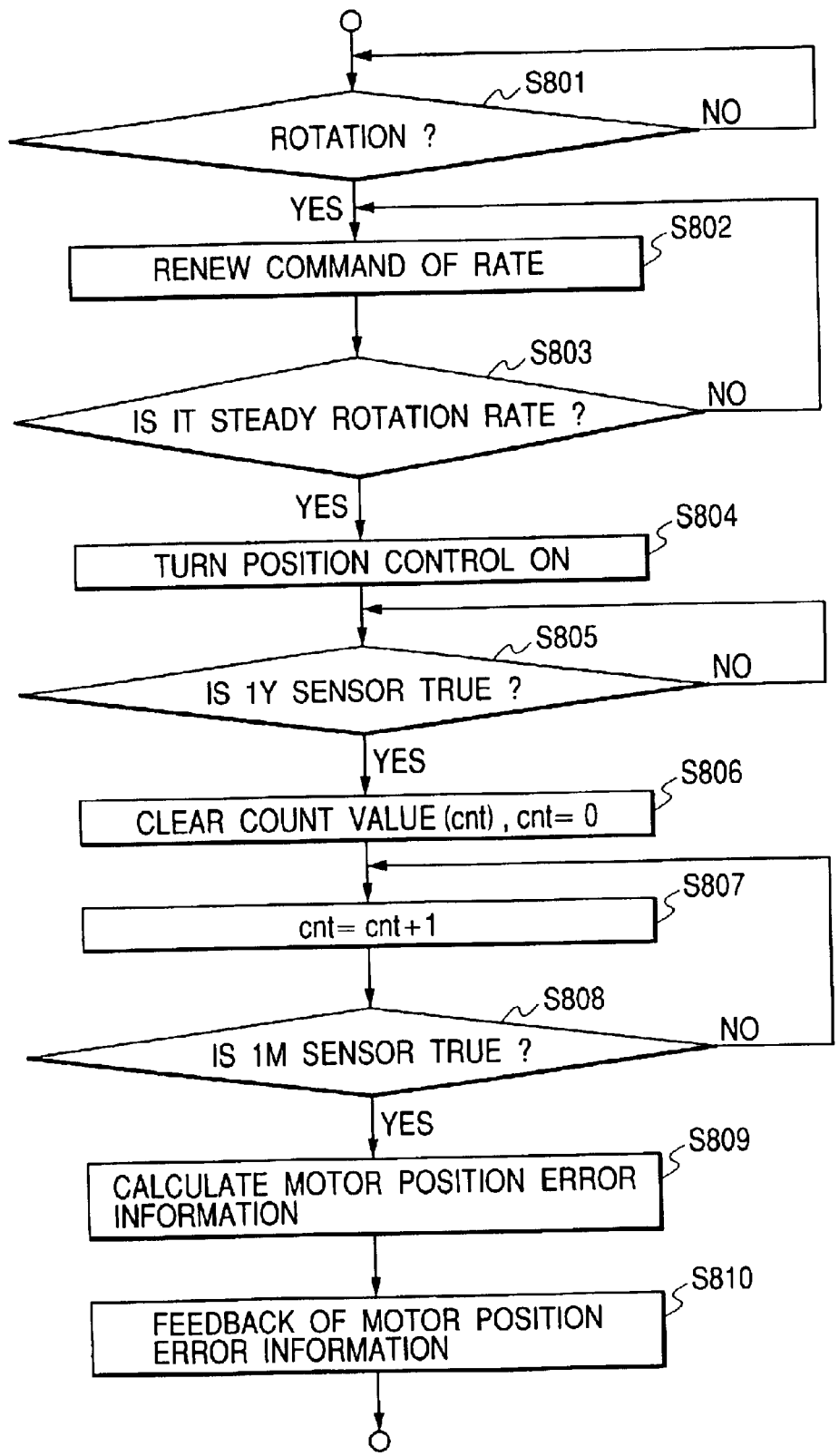
FIG. 8 is a flow chart explaining operations of a second embodiment of the present invention.
Figure 9:
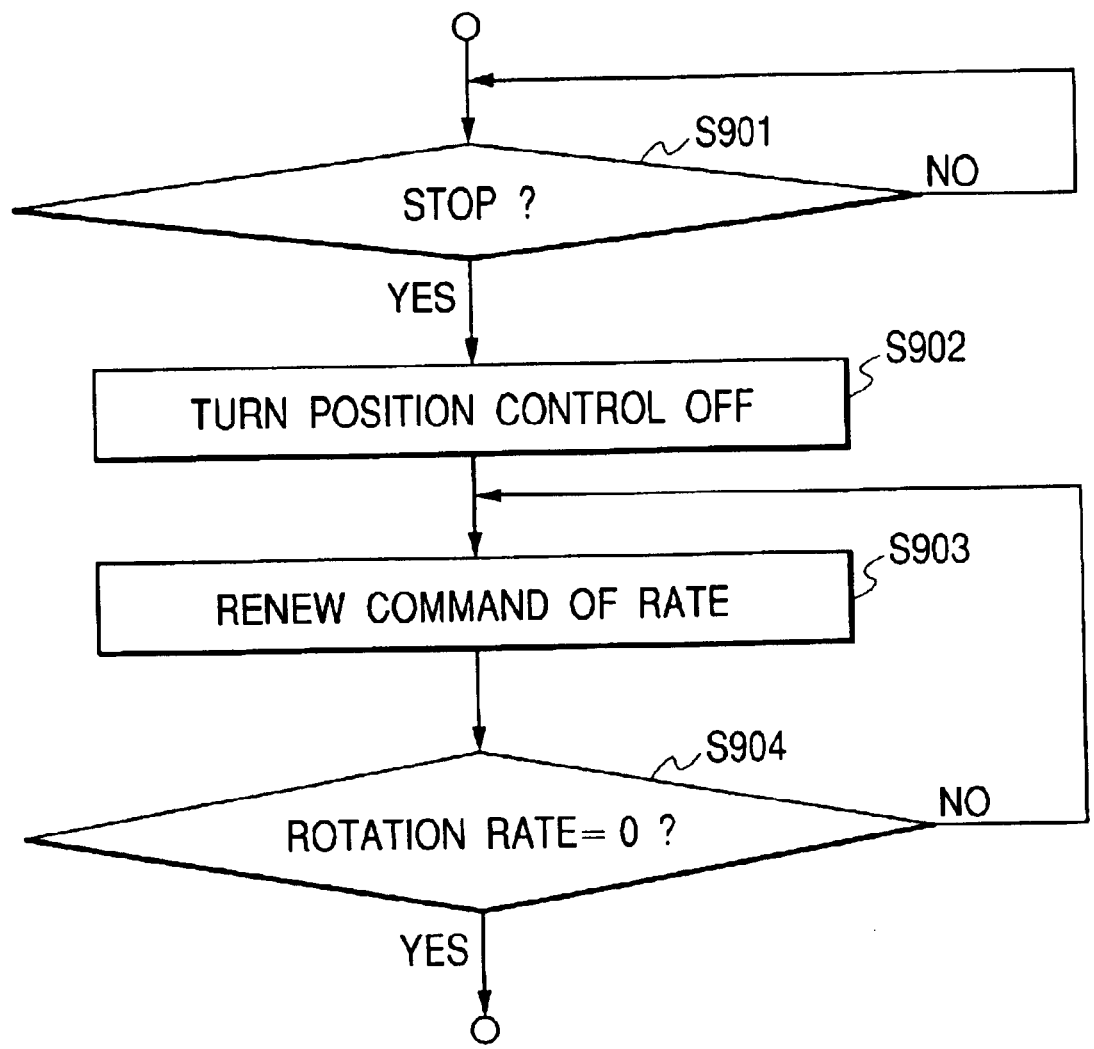
FIG. 9 is a flow chart explaining operations of the second embodiment of the present invention.

Operation of this circuit will be described based on FIGS. 8 and 9.

When startup of the DC brushless motors 40 is instructed from the printer control part 11 (S801), the motor control part 14 applies rate control to each DC brushless motor 40, renews the command of rate in accordance with the fixed acceleration curve to accelerate each DC brushless motor 40 so as to minimize the relative number of rotations of each DC brushless motor 40 (S802).

At a point when all the DC brushless motors 40 reach a final rotation rate (S803), the motor control part 14 starts position control (S804).

Next, the motor control part 14 starts detection of the rotation phase difference between the reference rotation body 1Y and the other rotation body 1M.

That is, the motor control part 14 clears the count value cnt for time measurement at a point (S805) when a signal is outputted from the photosensor 49 of the reference rotation body 1Y (S806) and thereafter increments the count value cnt at a fixed cycle (S807).

The motor control part 14 stops incrementing the count value cnt at a point (S808) when the signal from the photosensor 49 of the rotation body 1M is outputted and calculates position error information of the DC brushless motors 40 from the measured time (S809).

The calculated position error information of the DC brushless motors 40 is fed back to the position control loop of the DC brushless motors 40, and the motor control part 14 performs control so as to eliminate the position error (S810).

In this case, a coefficient for calculation of the position control operation amount, that is, a value of each parameter used in calculation of the operation amount of the position control loop may be changed according to a value of the position error, that is, an absolute value of the position error information.

For example, if the absolute value of the position error information is large, the motor control part 14 decreases a gain of the position control loop to secure stability of control.

When the motor control part 14 is instructed to stop the DC brushless motors 40 from the printer control part 11 (S901), the motor control part 14 cuts off the position control (S902) and renews the command of rate in accordance with the fixed deceleration curve to decelerate each DC brushless motor 40 (S903) so as to minimize the relative number of rotations of each DC brushless motor 40 only by rate control.

The motor control part 14 ends the deceleration sequence at a point when the rate of the DC brushless motors 40 is reduced to zero (S904).

This deceleration curve is assumed to be gentler than the deceleration curve in the case in which the DC brushless motors 40 naturally decelerate by a friction loss when a load torque is the smallest.

Alternatively, the motor control part 14 may decelerate the DC brushless motors 40 in accordance with the fixed deceleration curve by a braking operation on each DC brushless motor 40. The deceleration curve in this case is assumed to be steeper than the deceleration curve in the case in which the DC brushless motors 40 naturally decelerate by a friction loss when a load torque is the largest.

As described above, the motor control part 14 controls the DC brushless motors 40 such that the relative number of rotations of each DC brushless motor 40 at the times of startup and stop is minimized, whereby the shift between a desired phase and an actual phase of each of the rotation bodies 1Y, 1M, 1C and 1K is kept small, and time required until a phase of each of the rotation bodies 1Y, 1M, 1C and 1K is adjusted to a target phase after starting up the CD brushless motors 40 can be reduced.

A description of the execution of the initial sequence will be omitted because it is the same as that in the first embodiment.

Further, the desired rotation phase, that is, the rotation phase of each of the rotation bodies 1Y, 1M, 1C and 1K for inhibiting AC color drift is obtained in advance by executing the rotation phase detection sequence. The rotation phase is sent to the motor control part 14 from the printer control part 11.

(Third embodiment)

A third embodiment of the present invention will be described.

Since a configuration of the motors and the image forming part 15 and a schematic configuration of a control system of the third embodiment are identical as those in the first embodiment, descriptions on them will be omitted.

The third embodiment is different from the first embodiment in that the motor control part 14 compares the home position signal of each of the rotation bodies 1Y, 1M, 1C and 1K with an independent signal separate from the home position signals of the rotation bodies 1Y, 1M, 1C and 1K, for example, a motor rate ready signal indicating that all the CD brushless motors 40 have reached a target rate, as a reference and calculates the position error information of the DC brushless motors 40.

Figure 10:
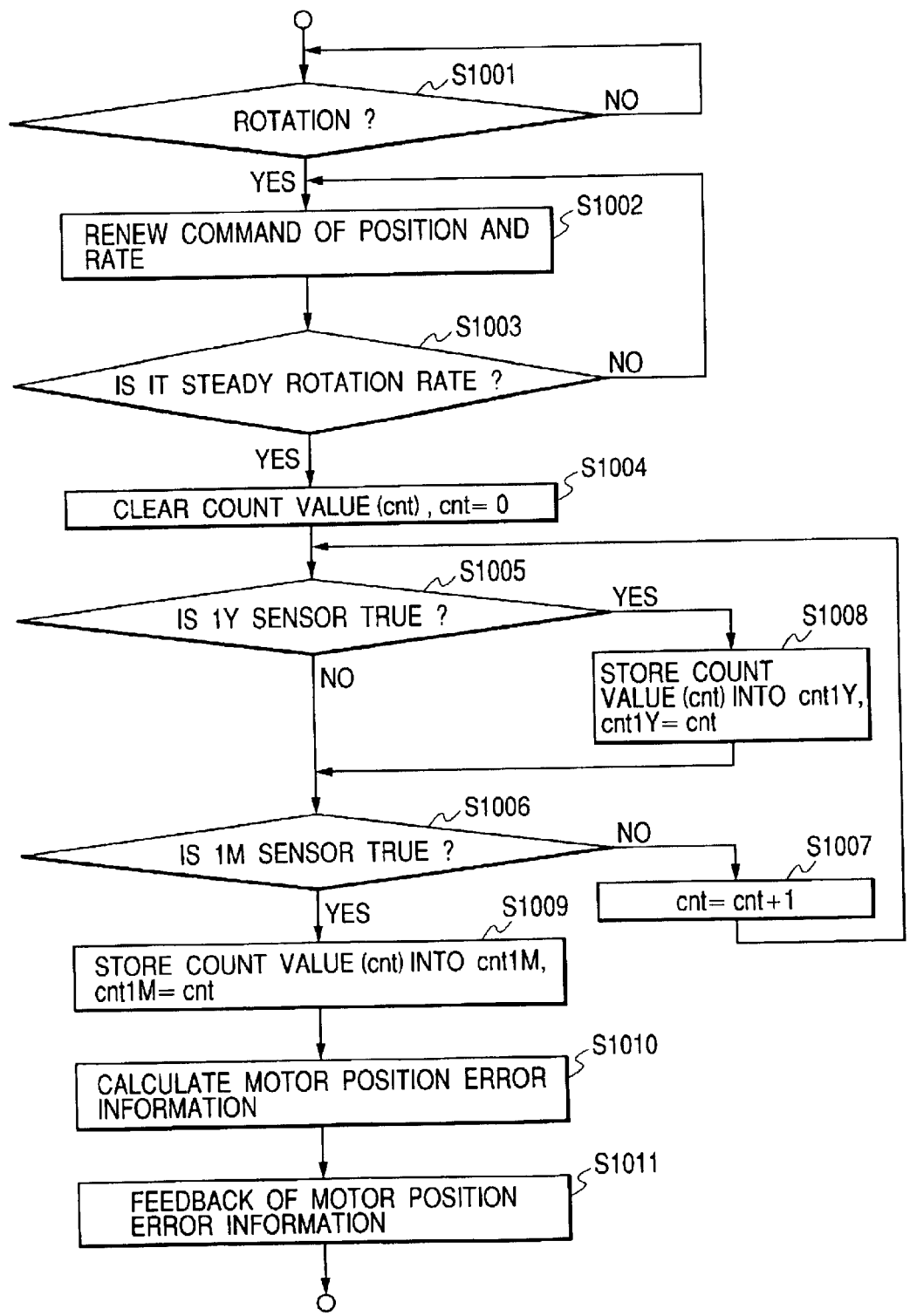
FIG. 10 is a flow chart explaining operations of a third embodiment of the present invention.
Figure 11:
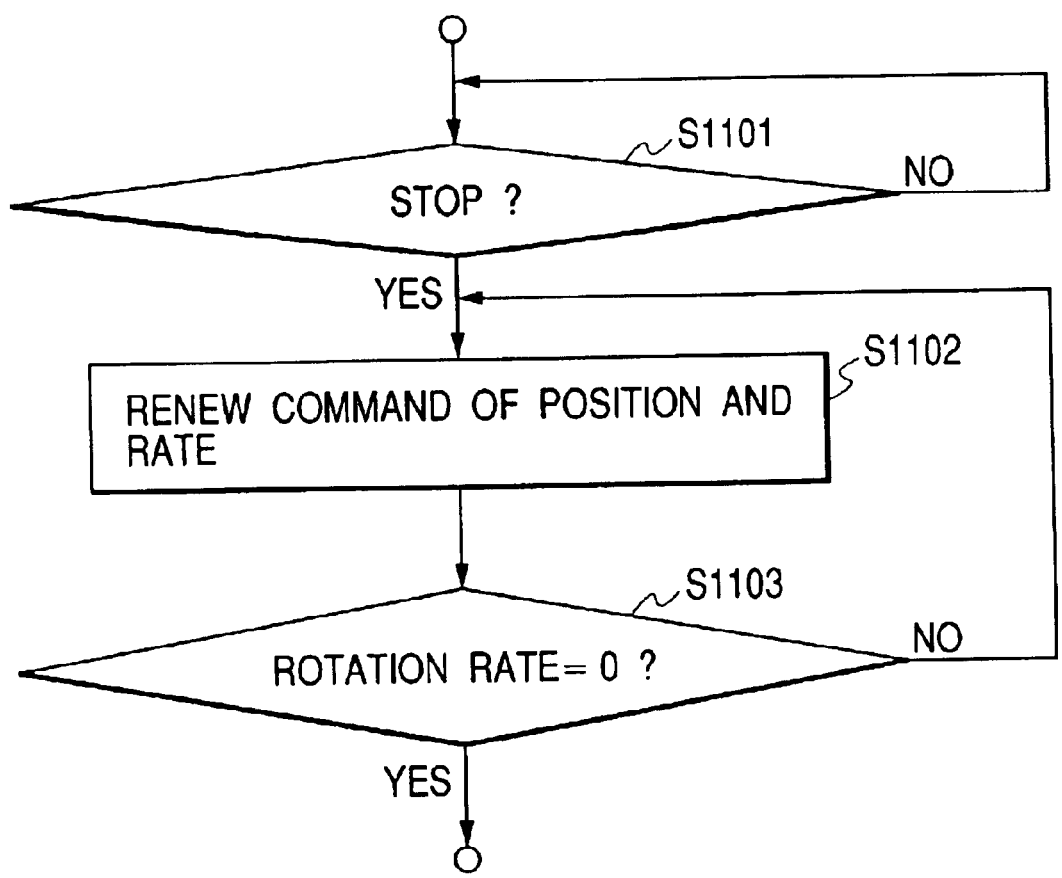
FIG. 11 is a flow chart explaining operations of the third embodiment of the present invention.
Figure 12:
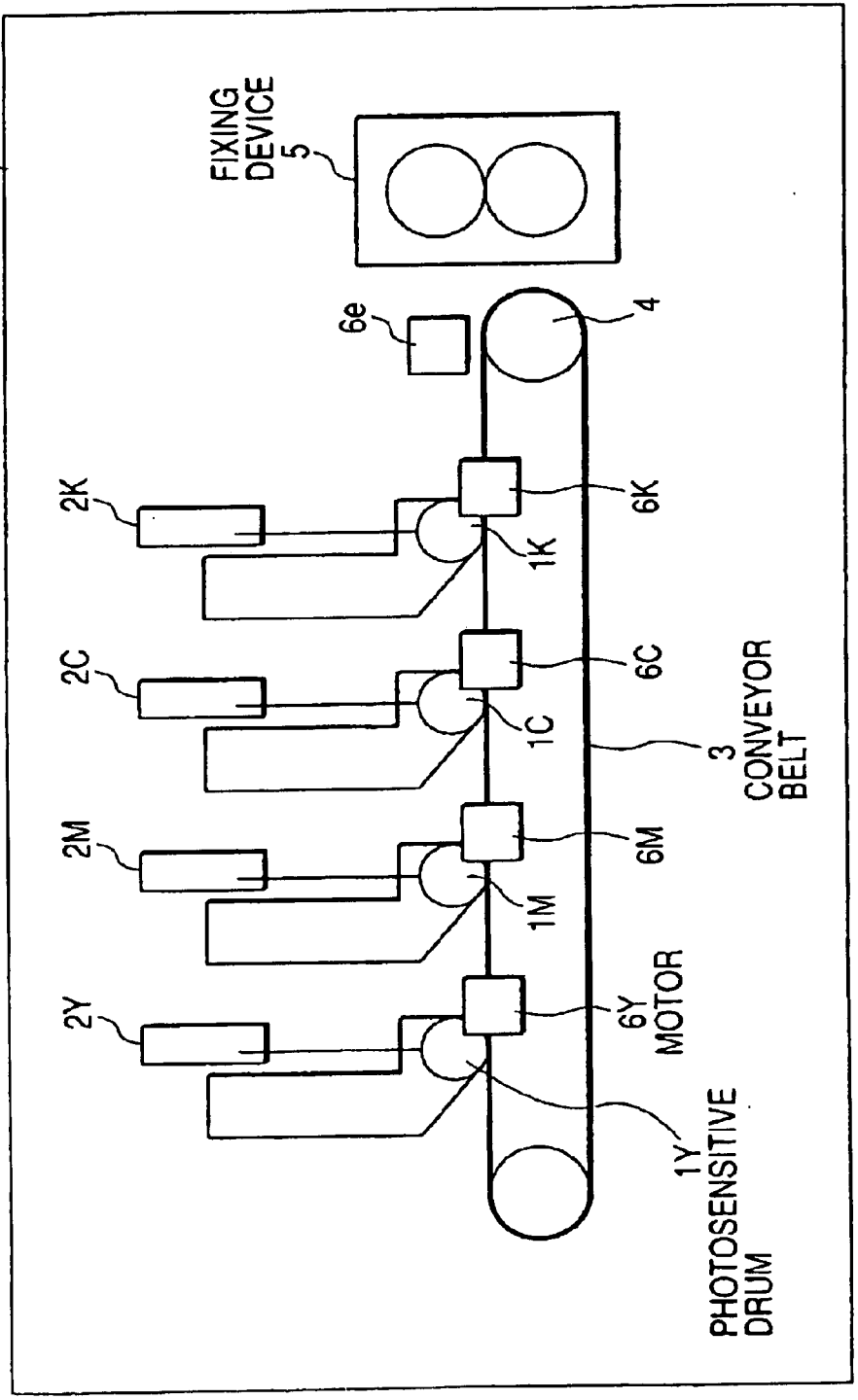
FIG. 12 is a diagram illustrating motors and an image forming part.
Figure 13:
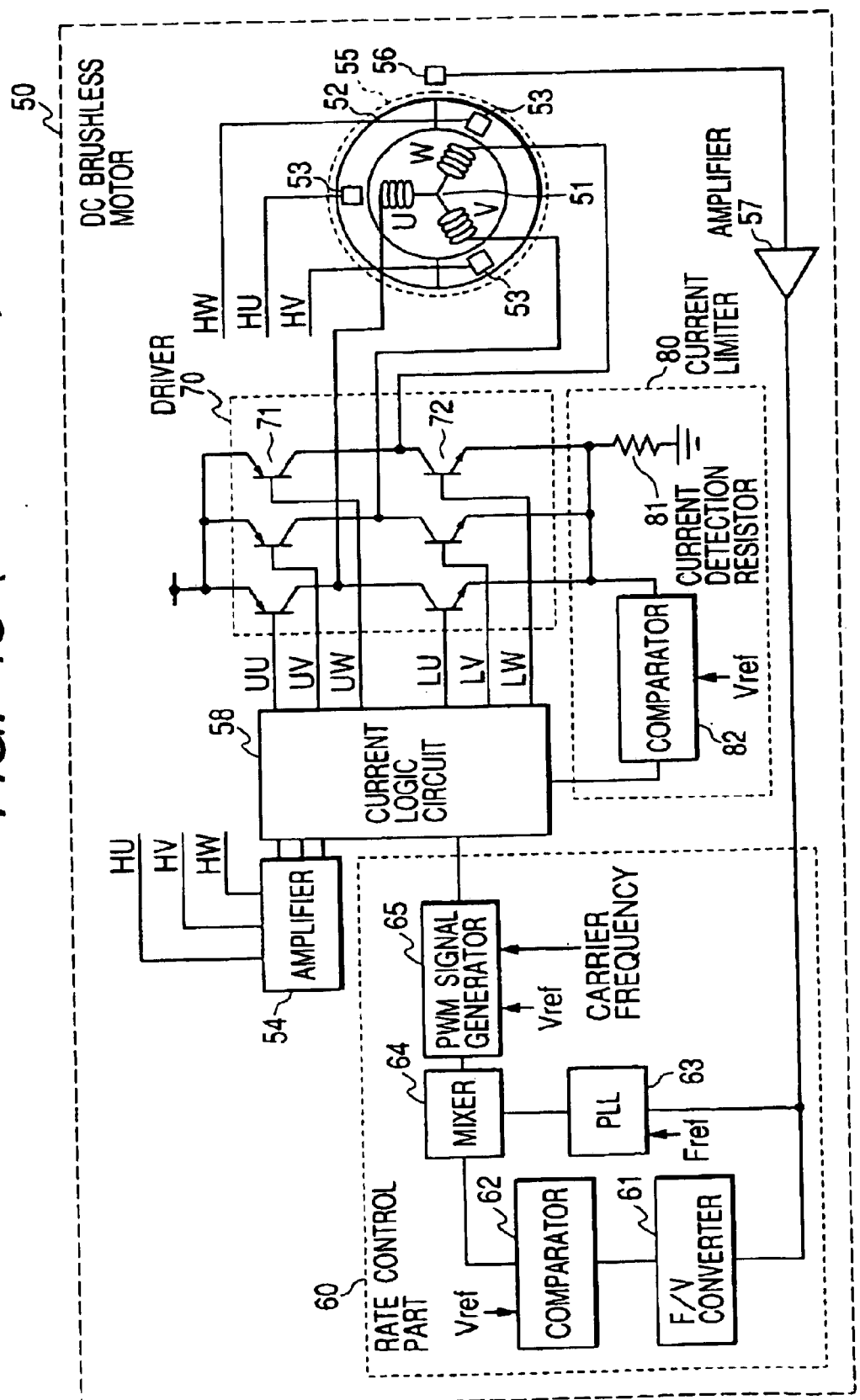
FIG. 13 is a diagram illustrating a DC brushless motor and nearby elements.

Operation of this circuit will be described based on FIGS. 10 and 11.

When startup of the DC brushless motors 40 is instructed from the printer control part 11 (S1001), the motor control part 14 applies rate control and position control to each DC brushless motor 40, renews the command of position and rate in accordance with the predetermined acceleration curve to accelerate each DC brushless motor 40 so as to minimize the relative number of rotations of each DC brushless motor 40 (S1002).

When all the DC brushless motors 40 reach the steady rotation rate, the motor control part 14 ends the acceleration (S1003) and starts detection of the rotation phase difference between the reference rotation body 1Y and the rotation body 1M.

For example, at a point when the motor rate ready signal indicating that all the DC brushless motors have reached a target rate is outputted, the motor control part 14 clears the count value cnt for time measurement up to a point when a signal from the photosensors 49 of the rotation bodies 1Y, 1M, 1C and 1K is outputted (S1004), and monitors an output of the photosensor 49 of each of the rotation bodies 1Y, 1M, 1C and 1K (S1005, S1006) and, at the same time, increments the count value cnt (S1007) at a fixed cycle.

The motor control part 14 stores the count value (cnt) into a cnt 1Y (S1008) at a point when a signal from the photosensor 49 of the rotation body 1Y is outputted and stores the count value (cnt) into a cnt 1M (S1009) at a point when a signal from the photosensor 49 of the rotation body 1M is outputted.

When measurement of home positions of both the rotation body 1Y and the rotation body 1M ends, the motor control part 14 calculates the position error information of the DC brushless motors 40 from a difference between the measured cnt 1Y and cnt 1M (S1010).

The calculated position error information of the DC brushless motors 40 is fed back to the position control loop of the DC brushless motors 40, and the motor control part 14 performs control so as to eliminate the position error (S1011).

In this case, a coefficient for calculation of the position control operation amount, that is, a value of each parameter used in calculation of the operation amount of the position control loop may be changed according to a value of the position error, that is, an absolute value of the position error information.

For example, if the absolute value of the position error information is large, the motor control part 14 decreases a gain of the position control loop to secure stability of control.

When the motor control part 14 is instructed to stop the DC brushless motors 40 from the printer control part 11 (S11O1), the motor control part 14 renews the command of position and rate in accordance with the fixed deceleration curve to decelerate each DC brushless motor 40 (S1102) so as to minimize the relative number of rotations of each DC brushless motor 40, and ends the deceleration sequence at a point when the DC brushless motors 40 stop (S1103).

This deceleration curve is assumed to be gentler than the deceleration curve in the case in which the DC brushless motors 40 naturally decelerate under the influence of a friction loss when a load torque is the smallest.

As described above, the motor control part 14 controls the DC brushless motors 40 such that the relative number of rotations of each DC brushless motor 40 at the times of startup and stop is minimized, whereby the shift between a desired phase and an actual phase of each of the rotation bodies 1Y, 1M, 1C and 1K is kept small, and time required until a phase of each of the rotation bodies 1Y, 1M, 1C and 1K is adjusted to a target phase after starting up the CD brushless motors 40 can be reduced.

A description of the execution of the initial sequence will be omitted because it is the same as that in the first embodiment.

Further, the desired rotation phase, that is, the rotation phase of each of the rotation bodies 1Y, 1M, 1C and 1K for inhibiting AC color drift is obtained in advance by executing the rotation phase detection sequence. The rotation phase is sent to the motor control part 14 from the printer control part 11.

As described above, according to the present invention, an image forming apparatus is provided which is capable of performing phase control of rotation bodies inexpensively and accurately and is capable of reducing time until completion of phase adjustment at the time of a print operation to prevent first print time from becoming long.

Thus, the present invention has been described with reference to a few preferred embodiments. However, it is evident that the present invention is not limited to these embodiments and various modifications and applications are possible within the scope of the appended claims.

What is claimed is:

1. A color image forming apparatus, comprising:
    a plurality of rotation members, each adapted to support an image;
    a plurality of motors, each adapted to drive a respective one of said rotation members;
    position detectors adapted to detect one home position of each of said rotation members, respectively, and to generate a detection signal once in one rotation of each of said rotation members;
    speed detectors adapted to detect a speed of each motor for use in producing respective integrated speed information relating to each motor; and
    a controller adapted to provide position control function for said motors by software servo-control, and to control a rotational phase of said rotation members, based on the detection signals from said position detectors and the integrated speed information of said motors from said speed detectors.

2. A color image forming apparatus according to claim 1, wherein said controller controls a rotational phase of said rotational body based on the detection signals from said position detectors such that the difference of each phase of the rotational bodies assumes a desired value.

3. A color image forming apparatus according to claim 1, wherein said controller further provides speed control function for said motors.

4. A color image forming apparatus according to claim 1, wherein said controller calculates position error information for said motors based on the detection signal from corresponding ones of said position detectors, and controls a rotational phase of each motor respectively, so as to eliminate the positioning error.

5. A color image forming apparatus according to claim 4, wherein said controller changes a coefficient value for calculation of a position control operation amount of a given one of said motors based on the position error information for that motor.

6. A color image forming apparatus according to claim 4, wherein, when the speed of said motors becomes a constant value, said controller starts to calculate position error information for said motors.

7. A color image forming apparatus according to claim 1, wherein, when starting up or stopping a plurality of said motors simultaneously, said controller controls those motors such that a relative rotational speed of those motors is minimized without performing the position control function for those motors.

8. A color image forming apparatus according to claim 1, wherein said motors are DC motors.

9. A color image forming apparatus according to claim 1, wherein said controller is a digital signal processor or microcomputer.

10. An image forming apparatus according to claim 9, wherein said controller performs digital signal processing using a DSP or a microcomputer.

11. An image forming apparatus according to claim 1, wherein said rotation bodies are photosensitive drums.

12. A color image forming apparatus according to claim 1, wherein said controller calculates the rotational position of the rotational body by integrating rotational speed information.

13. A motor controlling apparatus according to claim 12, wherein said controller further provides speed control function for said motor.

14. A motor controlling apparatus comprising:
    a rotation member adapted to support an image;
    a motor adapted to drive said rotation member;
    a position detector adapted to detect one home position of said rotation member and to generate a detection signal once in one rotation of said rotation member;
    a speed detector adapted to detect a speed of said motor for use in producing respective integrated speed information relating to said motor; and
    a controller adapted to provide position control function for said motor by software servo-control, and to control a rotational phase of said rotation member based on the detection signal from said position detector and the integrated speed information of said motor from said speed detector.

15. A motor controlling apparatus according to claim 14, wherein said controller calculates the rotational position of said rotation member by integrating rotational speed information.

16. A motor controlling apparatus according to claim 14, wherein said controller calculates position error information for said motor based on the detection signal from said position detector, and controls control a rotational phase of said motor so as to eliminate the positioning error.

17. A motor controlling apparatus according to claim 16, wherein said controller changes a coefficient value for calculation of a position control operation amount of said motor based on the position error information for said motor.

18. A motor controlling apparatus according to claim 16, wherein when the speed of said motor becomes a constant value, said controller starts to calculate position error information for said motor.

19. A motor controlling apparatus according to claim 14, wherein said motor is a DC motor.

20. A motor controlling apparatus according to claim 14, wherein said controller is a digital signal processor or microcomputer.

21. A motor controlling apparatus according to claim 20, wherein said controller performs digital signal processing using a DSP or a microcomputer.

22. A motor controlling apparatus according to claim 14, wherein said rotation member is a photosensitive drum.

* * * * *

UNITED STATES PATENT AND TRADEMARK OFFICE
CERTIFICATE OF CORRECTION

| | | |
|---|---|---|
| PATENT NO. | : 7,038,404 B2 | Page 1 of 1 |
| APPLICATION NO. | : 10/188751 | |
| DATED | : May 2, 2006 | |
| INVENTOR(S) | : Shigeru Kameyama | |

It is certified that error appears in the above-identified patent and that said Letters Patent is hereby corrected as shown below:

<u>COLUMN 1</u>

Line 29, "donates" should read --denotes--.

<u>COLUMN 5</u>

Line 44, "(Although" should read --Although--.

<u>COLUMN 6</u>

Line 57, "configuration,." should read --configuration,--.

<u>COLUMN 10</u>

Line 58, "(S11O1)," should read --(S1101),--.

<u>COLUMN 12</u>

Line 24, "A motor controlling" should read --A color image forming--.

Signed and Sealed this

Twelfth Day of December, 2006

JON W. DUDAS
*Director of the United States Patent and Trademark Office*